United States Patent
Lai et al.

(10) Patent No.: US 8,538,826 B1
(45) Date of Patent: Sep. 17, 2013

(54) APPLYING RESTRICTIONS TO ITEMS

(75) Inventors: Chin Man Lai, Seattle, WA (US); Somana P. Konganda, Seattle, WA (US); Marcella H. Nieswandt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/911,421

(22) Filed: Oct. 25, 2010

(51) Int. Cl.
*G06Q 30/00* (2012.01)
(52) U.S. Cl.
USPC .......................................... 705/26.1
(58) Field of Classification Search
USPC .......................................... 705/26.1
See application file for complete search history.

(56) References Cited

U.S. PATENT DOCUMENTS

| 7,783,596 B2 * | 8/2010 | Smolen et al. ................ 707/609 |
| 2007/0156545 A1 * | 7/2007 | Lin ................................. 705/28 |
| 2010/0023425 A1 * | 1/2010 | Price et al. ...................... 705/27 |
| 2010/0250360 A1 * | 9/2010 | Ball et al. ................... 705/14.29 |

* cited by examiner

*Primary Examiner* — Mila Airapetian
(74) *Attorney, Agent, or Firm* — Thomas|Horstemeyer, LLP (57) ABSTRACT

Disclosed are various embodiments for applying restrictions to items. Multiple rejection rules are applied to each item in a catalog of items. Each of the rejection rules is associated with one or more conditions in a geographic area. The respective item is designated as restricted for the geographic area when the conditions are met.

20 Claims, 6 Drawing Sheets

APPLYING RESTRICTIONS TO ITEMS

BACKGROUND

Merchants who engage in global shipping are burdened with complying with numerous rules. As an example, a shipping carrier may refuse to accept hazardous items for shipment. As another example, a country may refuse to allow items that include sensitive technologies to be exported to other countries. As yet another example, a country may refuse to allow items that are potentially dangerous to be imported. All in all, there are many such import and export regulations and contractual provisions that may impact the day-to-day business of a merchant.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to applying restrictions to items in a catalog of items. As used herein, the term "item" refers to any good, product, service, software item, multimedia item, or other item that may be offered for sale, purchase, download, lease, or any other form of consumption as can be appreciated. Merchants who sell globally are often faced with complying with a variety of import and export rules. As a non-limiting example, a country in which the fulfillment center of a merchant is located may refuse to allow items incorporating advanced cryptography technologies to be exported to certain other countries. As another non-limiting example, another country may refuse to allow items to be imported that may be used as weapons, such as knives longer than a certain length.

Ensuring that all restrictions are properly applied to all items in a catalog of items can be a daunting task, especially when items may be added or modified, for example, by other merchants within an electronic marketplace. In addition, rules may change over time, which may necessitate subsequent review of the same items in the catalog of items. Various embodiments of the present disclosure are configured to apply rules embodying import, export, and other restrictions to items in a catalog of items automatically, with manual review being employed as appropriate. In the following discussion, a general description of the system and its components is provided, followed by a discussion of the operation of the same.

Figure 1:
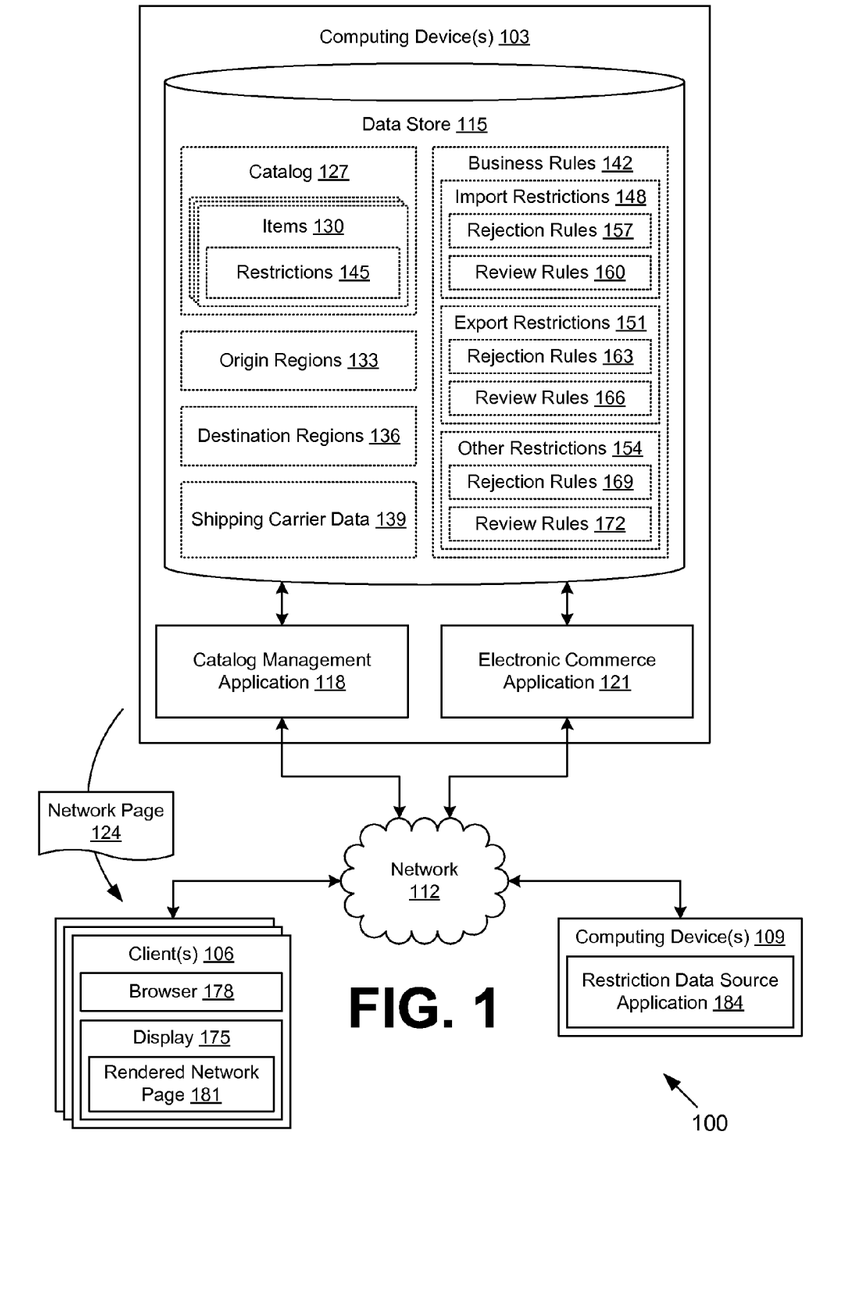
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 and one or more computing devices 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include a catalog management application 118, an electronic commerce application 121, and other applications, services, processes, systems, engines, or functionality not discussed in detail herein. The catalog management application 118 is executed to perform administration functions on a catalog of items. In one embodiment, multiple merchants within an electronic marketplace may have access to add items to the catalog and/or modify items in the catalog using the catalog management application 118. As disclosed herein, the catalog management application 118 may also be executed to apply various restrictions to items according to rules. In addition, the catalog management application 118 may generate network pages 124 such as, for example, web pages and or other types of network content that may be provided to clients 106 in order to facilitate access to catalog management functions.

The electronic commerce application 121 is executed in order to facilitate the online purchase of items from the electronic marketplace over the network 112. The electronic commerce application 121 also performs various backend functions associated with the online presence of the electronic marketplace in order to facilitate the online purchase of items. For example, the electronic commerce application 121 may generate network pages 124 such as, for example, web pages and/or other types of network content that may be provided to clients 106 for the purposes of selecting items for purchase, rental, download, lease, and/or other forms of consumption.

The network pages 124 may comprise hypertext markup language (HTML), extensible markup language (XML), JavaScript®, and/or other code along with text, images, audio, video, and/or other multimedia. The catalog management application 118 and/or the electronic commerce application 121 may include one or more network page servers for the purpose of serving up network pages 124 to clients 106 in response to requests. The network page server may employ, for example, hypertext transfer protocol (HTTP) and/or other protocols for data communication over the network 112. Non-limiting examples of commercially available network page servers include Apache® HTTP Server, Apache® Tomcat®, Microsoft® Internet Information Services (IIS), etc.

The data stored in the data store 115 includes, for example, a catalog 127 of items 130, origin regions 133, destination regions 136, shipping carrier data 139, business rules 142, and potentially other data. The catalog 127 includes a plurality of items 130. In one embodiment, the catalog 127 is associated with a single merchant. In another embodiment, the catalog 127 may be associated with multiple merchants within a single electronic marketplace. In such an embodiment, some of the items 130 may be associated with one merchant, while other items 130 may be associated with another merchant. Some of the items 130 may be associated with multiple merchants. Each item 130 may include various data such as, for example, title, description, price, weight, customer reviews, categories, quantities, conditions, options, and/or other data.

In particular, an item 130 may be associated with one or more restrictions 145. As a non-limiting example, a restriction 145 may specify that an item 130 may not be shipped or sold to addresses within certain countries, states, and/or other geographic areas. As another non-limiting example, a restriction 145 may specify that an item 130 may not be shipped from a given fulfillment center in a certain geographic area to certain destinations. As another non-limiting example, a restriction 145 may specify that an item 130 may not be shipped using a certain shipping carrier or shipping method. As yet another non-limiting example, a restriction 145 may specify that an item 130 may not be shipped at all and may be available only for in-person pick-up from the merchant. It is understood that many different types of restrictions 145 may be applied to items 130.

The origin regions 133 define geographic areas such as, for example, countries, states, provinces, cities, jurisdictions, and/or other geographic areas from which the items 130 may be shipped. In one embodiment, the origin regions 133 may correspond to geographic areas where fulfillment centers associated with the merchants of the electronic marketplace are located. The destination regions 136 define the geographic areas to which the items 130 may, in general, be shipped. The destination regions 136 may include countries, states, provinces, cities, jurisdictions, and/or other geographic areas. The shipping carrier data 139 may include data associated with shipping carriers that may offer various shipping methods and services for shipment of the items 130 to customers. The shipping carrier data 139 may specify limitations on what types of items 130 may be shipped, shipping costs, optional services, required services, and/or other information relating to shipment of items 130 through the respective shipping carrier.

The business rules 142 may include import restrictions 148, export restrictions 151, other restrictions 154 and/or other business rules 142. The import restrictions 148 include rejection rules 157 and review rules 160, the export restrictions 151 may include rejection rules 163 and review rules 166, and the other restrictions 154 may include rejection rules 169 and review rules 172. The rejection rules 157 of the import restrictions 148 specify conditions that, if met, result in an item 130 being designated as restricted from importation to a certain geographic area. The review rules 160 of the import restrictions 148 specify conditions that, if met, result in the item 130 being subjected to a manual review.

The rejection rules 163 of the export restrictions 151 specify conditions that, if met, result in the item 130 being restricted from exportation to a particular geographic area. The review rules 166 of the export restrictions 151 specify conditions that, if met, subject the item 130 to manual review. The rejection rules 169 of the other restrictions 154 specify conditions that, if met, result in the item 130 being designated as restricted in some way, for example, from shipment by a certain shipping carrier. The review rules 172 of the other restrictions 154 specify conditions that, if met, result in the item 130 being subjected to a manual review for possible application of a restriction 145. As a non-limiting example, the other restrictions 154 may correspond to business rules 142 that may be used to arbitrarily set restrictions 145 such as a category of items 130 that may not be shipped for environmental, public relations, or other reasons.

Figure 2:
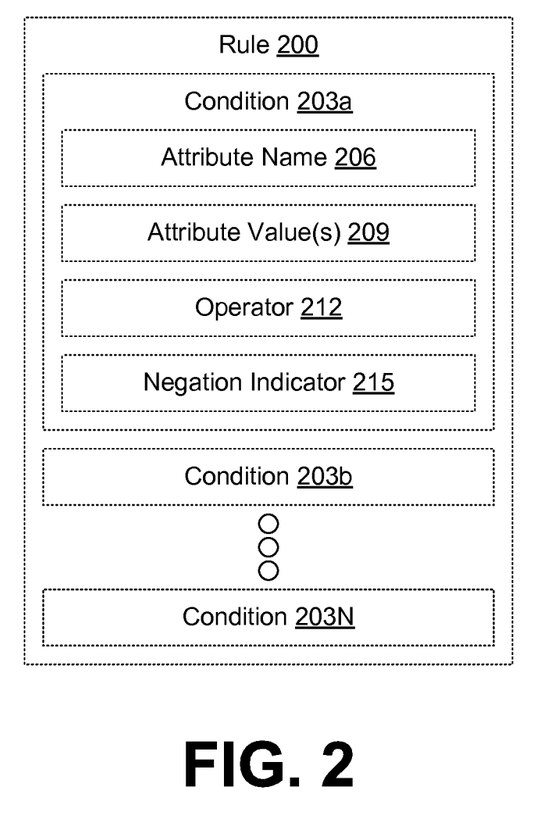
FIG. 2 is an illustration of a rule maintained in a data store in a computing device in the networked environment of FIG. 1 according an embodiment of the present disclosure.

Turning now to FIG. 2, shown is one example of a rule 200 that is stored in the data store 115 (FIG. 1) in the computing device 103 (FIG. 1) employed in the networked environment 100 (FIG. 1) according to one embodiment. The rule 200 is an example representation of an implementation of any one of the rejection rules 157 (FIG. 1), 163 (FIG. 1), 169 (FIG. 1), or the review rules 160 (FIG. 1), 166 (FIG. 1), 172 (FIG. 1) in the business rules 142. Each rule 200 may include a plurality of conditions 203 and other data depending on the type of rule 200. As a non-limiting example, a rule 200 may include a geographic area when it is used within an import restriction 148 or an export restriction 151. As another non-limiting example, a rule 200 may include a shipping carrier when it is used in one of the other restrictions 154. Each condition 203 may include an attribute name 206, one or more attribute values 209, an operator 212, a negation indicator 215, and/or other data.

The attribute name 206 may refer to a type of attribute associated with an item 130 (FIG. 1). For example, the attribute name 206 may indicate title, keywords, description, price, size, dimensions, and/or other attributes associated with an item 130. The attribute values 209 provides data that may be used in comparison with the attribute of an item 130 indicated by the attribute name 206. For example, an attribute value 209 may include a word or phrase that is used for comparison with the title of an item 130. The operator 212 may correspond to any operation that may be applied to the attribute of the item 130 indicated by the attribute name 206 and using one or more of the attribute values 209. Non-limiting examples of an operator 212 may include equals, less than, greater than, contains, or other operators as can be appreciated. The negation indicator 215 indicates whether the result from the operation specified by the operator 212 is to be negated.

Ultimately, a condition 203 may result in a Boolean value. In one embodiment, when all conditions 203 making up a rule 200 are "true," the rule 200 evaluates to "true." In another embodiment, when any one of the conditions 203 evaluates to "true," then the rule 200 is considered to have a "true" result as well. In other embodiments, a predetermined number of conditions 203 may evaluate to "true" for the rule 200 to evaluate to "true." It is understood that the combination of the conditions 203 that are required to evaluate to "true" may be configurable in various embodiments.

Referring back to FIG. 1, the client 106 is representative of a plurality of client devices that may be coupled to the network 112. The client 106 may comprise, for example, a processor-based system such as a computer system. Such a computer system may be embodied in the form of a desktop computer, a laptop computer, a personal digital assistant, a cellular telephone, a smart phone, set-top boxes, music players, web pads, tablet computer systems, game consoles, electronic book readers, or other devices with like capability. The client 106 may also include a display 175. The display 175 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 178 and/or other applications. The browser 178 may be executed in a client 106, for example, to access and render network pages 124 or other network content served up by the computing device 103 and/or other servers, thereby generating a rendered network page 181 on the display 175. The client 106 may be configured to execute applications beyond the browser 178 such as, for example, email applications, instant message applications, and/or other applications.

The computing device 109 may comprise, for example, a server computer or any other system providing computing capability. Alternatively, a plurality of computing devices 109 may be employed that are arranged, for example, in one or more server banks or computer banks or other arrangements. For example, a plurality of computing devices 109 together may comprise a cloud computing resource, a grid computing resource, and/or any other distributed computing arrangement. Such computing devices 109 may be located in a single installation or may be distributed among many different geographical locations. For purposes of convenience, the computing device 109 is referred to herein in the singular. Even though the computing device 109 is referred to in the singular, it is understood that a plurality of computing devices 109 may be employed in the various arrangements as described above.

Various applications and/or other functionality may be executed in the computing device 109 according to various embodiments. The components executed on the computing device 109, for example, include a restriction data source application 184 and other applications, services, processes, systems, engines, or functionality not discussed in detail herein. The restriction data source application 184 is executed to provide data regarding import restrictions 148, export restrictions 151, and/or other restrictions 154 as specified by a third party. In one embodiment, the restriction data source application 184 may also supply the shipping carrier data 139 where the computing device 109 is operated by a shipping carrier. In one embodiment, the computing device 109 is operated by the jurisdiction that has implemented an import restriction 148 or an export restriction 151. Although the restriction data source application 184 may supply data in a variety of formats, the formats may be automatically or manually translated into the import restrictions 148, export restrictions 151, and/or other restrictions 154 in various embodiments.

Next, a general description of the operation of the various components of the networked environment 100 is provided. To begin, various items 130 may be added to the catalog 127 by merchant users at the client 106 using an interface comprised of one or more network pages 124 generated by the catalog management application 118. The merchant user may be adding new items 130 or modifying existing items 130 in the catalog 127. As the items 130 are added and/or modified, at the completion of a management session, or at some other time, a process of the catalog management application 118 may begin to apply the restrictions 145 to the items 130. It is noted that the restrictions 145 may be applied both when new items 130 are added to the catalog 127 and when existing items 130 are modified in the catalog 127. It may be the case that modification of an item 130 may cause a new restriction 145 to be applied to the item 130 or an existing restriction 145 may be lifted from an item 130 as the restriction 145 may no longer be applicable to the modified item 130.

The catalog management application 118 may determine which of the import restrictions 148, export restrictions 151, and other restrictions 154 should be applied to the items 130 that have been added or modified through application of the business rules 142. It is noted that the import restrictions 148, export restrictions 151, and the other restrictions 154 may be applied in any order. Any sequence described herein is given merely as an example.

The rejection rules 157 of the import restrictions 148 are applied to the data associated with each item 130 to determine whether restrictions 145 should be applied concerning import of the items 130 to destination regions 136. If an item 130 is marked or otherwise designated as restricted for a destination region 136 by application of a rejection rule 157, a restriction 145 may be added. If the item 130 is not marked or otherwise designated as restricted by the rejection rules 157, the review rules 160 are next applied. The review rules 160 determine whether there will be a manual review of the item 130 to determine whether the item 130 should be restricted or should not be restricted. A manual review may also be indicated where a rejection rule 157, 163, or 169 is applied and results in a match that is not exact.

It is recognized that applying rejection rules 157, 163, and 169 automatically may result in false positives or false negatives. As a non-limiting example, a rejection rule 157 may reject an item 130 having a description that contains the phrase "crocodile leather" when the item 130 is to be shipped to a certain destination region 136. However, such a rejection rule 157 may improperly reject "imitation crocodile leather" or "faux crocodile leather." Therefore, in various embodiments, the respective rejection rules 157, 163, and 169 and the respective review rules 160, 166, and 172 are structured so as to apply a restriction 145 automatically when it is certain, or nearly certain, that the item 130 will be properly restricted. Where there is uncertainty, the review rules 160, 166, and 172 may be employed to facilitate a manual review where desirable. An auditing process of the rejection rules 157, 163, and 169 may be triggered when a false negative is detected after a manual review.

The catalog management application 118 may provide for manual review of the items 130 for possible application of restrictions 145 when the items 130 have been flagged as possibly restricted or otherwise submitted for further manual review after application of the review rules 160, 166, and 172. To this end, the catalog management application 118 may generate one or more network pages 124 containing information about the items 130 and the review rules 160, 166, and 172 that were used to flag the items 130. The network page 124 is sent to the client 106 for manual review by a merchant user. The network page 124 is shown on the display 175 as a rendered network page 181. After the user interacts with the rendered network page 181, an indication of whether a restriction 145 should be imposed on the item 130 is sent over the network 112 to the catalog management application 118. Thereafter, the catalog management application 118 may apply the restriction 145.

After the catalog 127 has been updated by the catalog management application 118, a user at a client 106 may request one or more network pages 124 from the electronic commerce application 121 over the network 112. The network pages 124 may describe one or more items 130 offered for sale by way of an electronic marketplace. When the user indicates an intention to purchase an item 130, the electronic commerce application 121 may collect information regarding the user or correlate an identification of the user with stored information respecting the user.

Based upon the origin region 133 associated with the fulfillment center that would be used to fulfill an order for the item 130 and the destination region 136 supplied by the user, the electronic commerce application 121 may determine whether restrictions 145 are associated with the item 130 such that the order could not be fulfilled. If such a restriction 145 exists, a network page 124 may be returned to the client 106 to permit the user an opportunity to select alternate items 130, specify alternate destination addresses, select alternate shipping carriers, select in-person pick-up options, or take some other action.

The catalog management application 118 may be configured to communicate periodically with the restriction data source application 184 in order to update business rules 142 that depend on external sources. The catalog management application 118 may be configured to pull data from the restriction data source application 184. Alternatively, or additionally, the restriction data source application 184 may be configured to push data to the catalog management application 118. The data transfer may occur periodically or in response to one or more events. The items 130 may be reprocessed with the updated business rules 142 to ensure that the restrictions 145 are properly applied.

Figure 3:
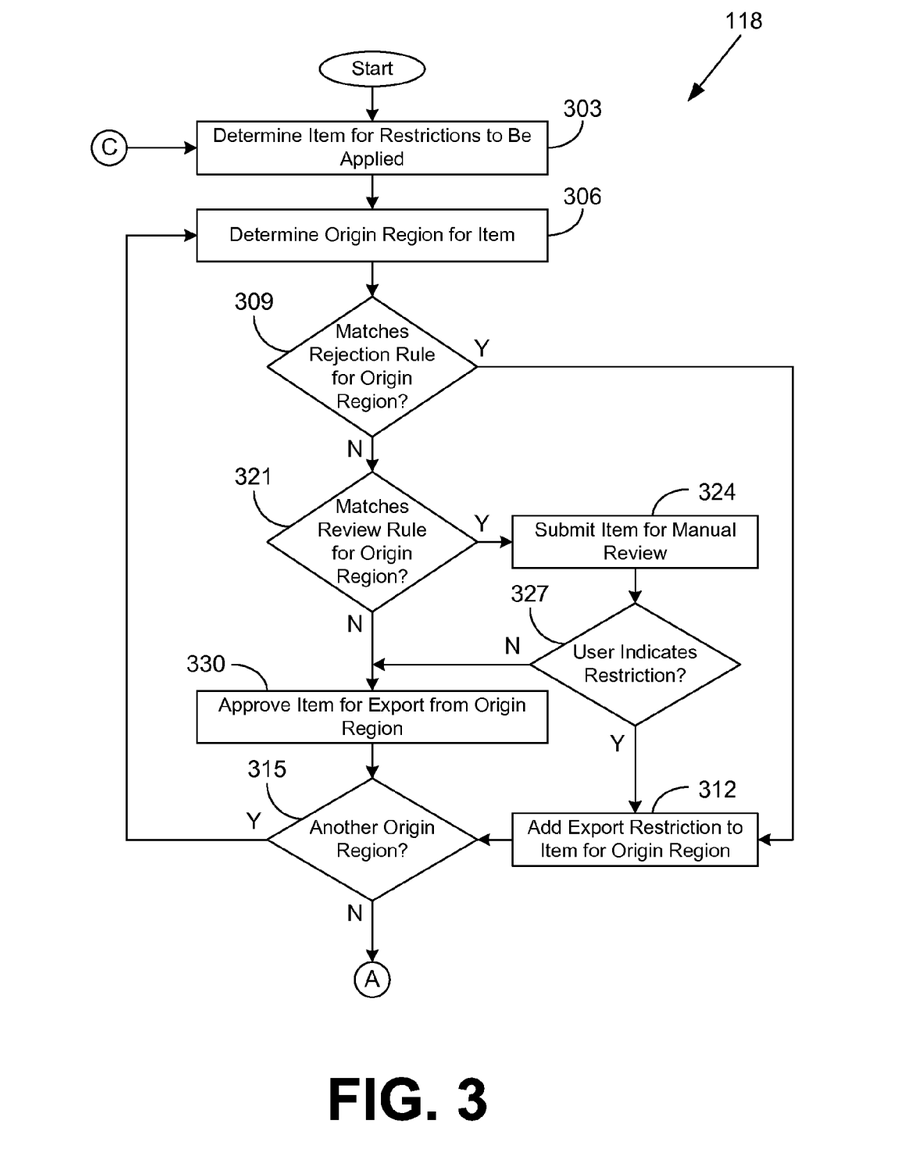
FIGS. 3-5 show a flowchart illustrating one example of functionality implemented as portions of a catalog management application executed in a computing device in the networked environment of FIG. 1 according to various embodiments of the present disclosure.
Figure 4:
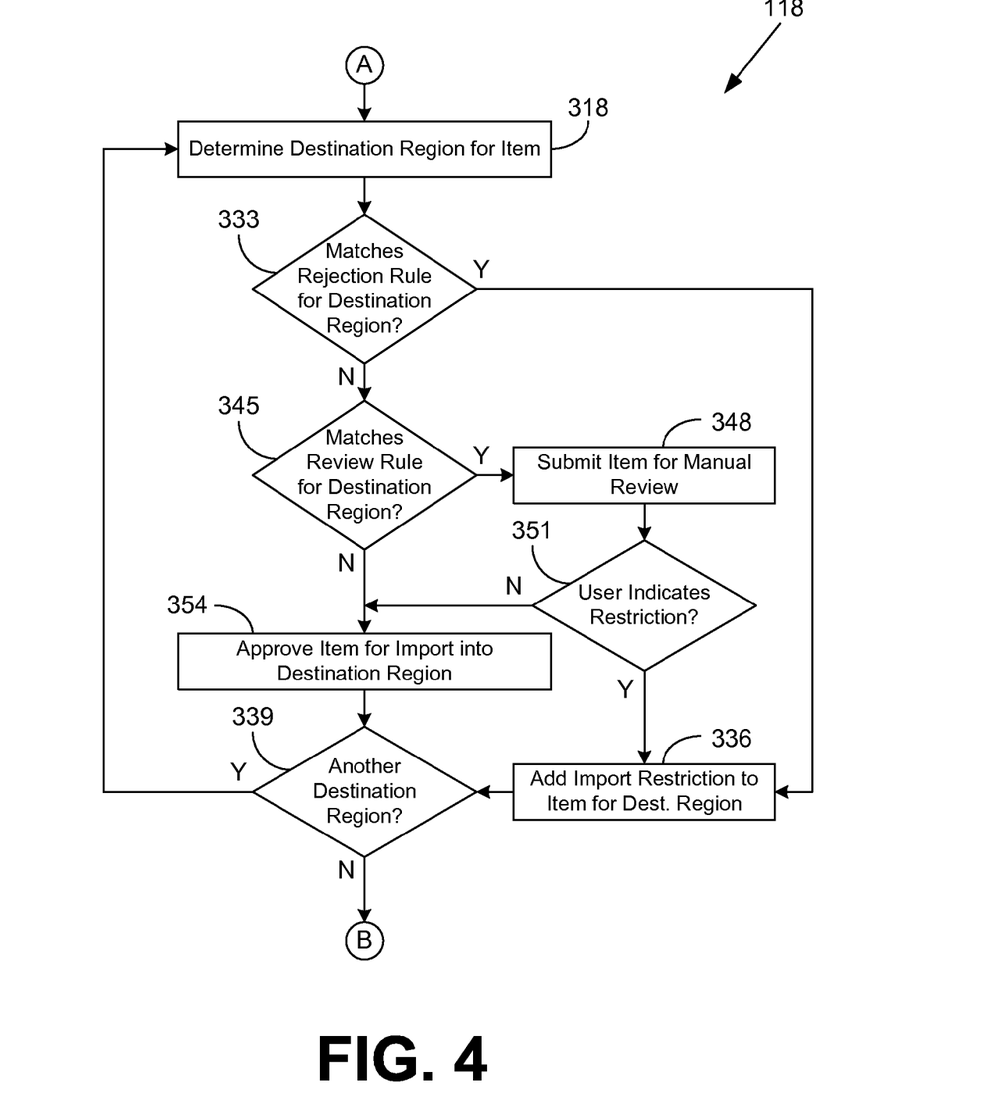
Figure 5:
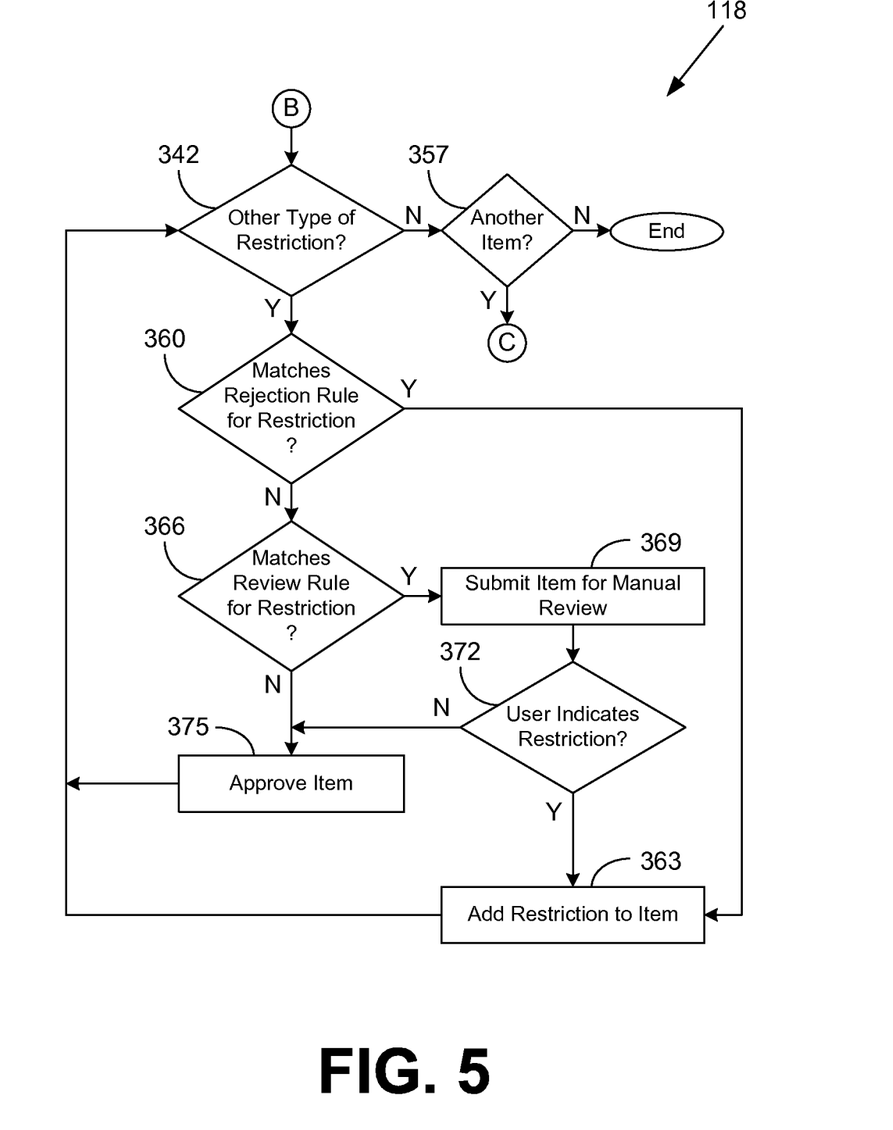

Referring next to FIGS. 3-5, shown is a flowchart that provides one example of the operation of a portion of the catalog management application 118 according to various embodiments. It is understood that the flowchart of FIGS. 3-5 provides merely an example of the many different types of functional arrangements that may be employed to implement the operation of the portion of the catalog management application 118 as described herein. As an alternative, the flowchart of FIGS. 3-5 may be viewed as depicting an example method implemented in the computing device 103 (FIG. 1) according to one or more embodiments.

Beginning with box 303, the catalog management application 118 determines an item 130 (FIG. 1) from the catalog 127 (FIG. 1) for restrictions 145 (FIG. 1) to be applied. In box 306, the catalog management application 118 determines the origin region 133 (FIG. 1) for the item 130. In one embodiment, the origin region 133 may correspond to a geographic area in which a fulfillment center, shipping warehouse, or other materials handling facility holds inventory of the item 130 for export. In box 309, the catalog management application 118 determines whether the item 130 matches a rejection rule 163 (FIG. 1) of an export restriction 151 (FIG. 1) associated with the origin region 133.

If the item 130 matches a rejection rule 163 for the origin region 133, the catalog management application 118 moves to box 312 and adds an export restriction 151 to the item 130 as a restriction 145 for the origin region 133. Next, the catalog management application 118 proceeds to box 315 and determines whether another origin region 133 is to be processed for the item 130. If another origin region 133 is to be processed for the item 130, the catalog management application 118 returns to box 306 and determines the next origin region 133 for the item 130. Otherwise, if no other origin region 133 remains to be processed, the catalog management application 118 proceeds to box 318 on FIG. 4.

If, in box 309, the catalog management application 118 instead determines that the item 130 does not match a rejection rule 163 for the origin region 133, the catalog management application 118 proceeds to box 321 and determines whether the item 130 matches a review rule 166 (FIG. 1) for the origin region 133. If the item 130 does match a review rule 166 for the origin region 133, the catalog management application 118 proceeds to box 324 and submits the item 130 for a manual review. Following the manual review, the catalog management application 118 proceeds to box 327 and determines whether a user indicates in the manual review that the restriction 145 should be applied to the item 130. If the restriction 145 should be applied to the item 130, the catalog management application 118 proceeds to box 312 and adds an export restriction 151 to the item 130 as a restriction 145 for the origin region 133. The catalog management application 118 then proceeds to box 315 and determines whether another origin region 133 remains to be processed.

If, instead, in box 327, the catalog management application 118 determines that the user has not indicated that a restriction 145 should be applied in the manual review, the catalog management application 118 proceeds to box 330. If, in box 321, the catalog management application 118 instead determines that the item 130 does not match a review rule 166 for the origin region 133, the catalog management application 118 also proceeds to box 330.

In box 330, the catalog management application 118 approves the item 130 for export from the origin region 133. Such an approval may be noted within the item 130 or may be understood by the absence of restriction 145 associated with the origin region 133. In some embodiments, the item 130 may be removed from the catalog 127 when not approved for export from the origin region 133. Thereafter, the catalog management application 118 proceeds to box 315 where it is determined whether another origin region 133 remains to be processed. When no other origin region 133 remains to be processed for the item 130, the catalog management application 118 proceeds to box 318 in FIG. 4.

In box 318, the catalog management application 118 determines a destination region 136 (FIG. 1) for the item 130. The destination region 136 may, for example, represent a country to which a merchant associated with the item 130 has agreed to import items 130. In box 333, the catalog management application 118 determines whether the item 130 matches a rejection rule 157 (FIG. 1) for the destination region 136. If the catalog management application 118 determines that the item 130 matches a rejection rule 157 for the destination region 136, the catalog management application 118 proceeds to box 336 and adds a restriction 145 corresponding to the import restriction 148 for the destination region 136 to the item 130.

Thereafter, the catalog management application 118 moves to box 339 and determines whether another destination region 136 remains to be processed for the item 130. If no other destination region 136 remains to be processed, the catalog management application 118 proceeds to box 342 in FIG. 5. If the catalog management application 118 determines in box 333 that the item 130 does not match a rejection rule 157 for the destination region 136, the catalog management application 118 transitions to box 345 and determines whether the item 130 matches a review rule 160 (FIG. 1) for the destination region 136.

If the item 130 does match a review rule 160 for the destination region 136, the catalog management application 118 moves to box 348 and submits the item 130 for manual review. After the manual review is completed, the catalog management application 118 proceeds to box 351 and determines whether a user has indicated that a restriction 145 should be applied to the item 130. If a restriction 145 should be applied to the item 130, the catalog management application 118 proceeds to box 336 and adds a restriction 145 corresponding to the import restriction 148 to the item 130 for the destination region 136. Thereafter, the catalog management application 118 moves to box 339 and determines whether another destination region 136 remains to be processed. Otherwise, the catalog management application 118 proceeds to box 354.

If the catalog management application 118 instead determines in box 345 that the item 130 does not match a review rule 160 for the destination region 136, the catalog management application 118 also proceeds to box 354. In box 354, the catalog management application 118 approves the item 130 for import into the destination region 136. Thereafter, the catalog management application 118 proceeds to box 339 and determines whether another destination region 136 remains to be processed. If another destination region 136 does not remain to be processed, the catalog management application 118 proceeds to box 342 in FIG. 5.

In box 342, the catalog management application 118 determines whether another type of restriction is configured. If no other restrictions 154 (FIG. 1) are configured, the catalog management application 118 proceeds to box 357 and determines whether another item 130 remains to be processed. If no other item 130 remains to be processed, the portion of the catalog management application 118 ends. If, instead, another item 130 does remain to be processed, the catalog management application 118 returns to box 303 in FIG. 3.

If the catalog management application 118 determines that another type of restriction remains to be processed, the catalog management application 118 instead proceeds to box 360 and determines whether the item 130 matches a rejection rule 169 (FIG. 1) for the other restriction 154. If the catalog management application 118 determines that the item 130 does match the rejection rule 169 for the other restriction 154, the catalog management application 118 proceeds to box 363 and adds the restriction 145 corresponding to the other restriction 154 to the item 130. Thereafter, the catalog management application 118 returns to box 342 and determines whether another type of restriction remains to be processed for the item 130.

If the catalog management application 118 determines that the item 130 does not match a rejection rule 169 for the other restriction 154, the catalog management application 118 proceeds to box 366 and determines whether the item 130 matches a review rule 172 (FIG. 1) for the other restriction 154. If the item 130 does match a review rule 172 for the other restriction 154, the catalog management application 118 moves to box 369 and submits the item 130 for a manual review. Following completion of the manual review, the catalog management application 118 transitions to box 372 and determines whether a user has indicated that a restriction 145 should be placed on the item 130. If the user indicates that a restriction 145 should be placed on the item 130, the catalog management application 118 proceeds to box 363 and adds the restriction 145 corresponding to the other restriction 154 to the item 130. Thereafter, the catalog management application 118 returns to box 342 and determines whether another type of restriction remains to be processed for the item 130.

If the user indicates instead that the restriction 145 is not to be placed on the item 130, the catalog management application 118 moves to box 375. Additionally, if the catalog management application 118 determines in box 366 that the item 130 does not match a review rule 172 for the other restriction 154, the catalog management application 118 also proceeds to box 375. In box 375, the item 130 is approved. In other words, no restriction 145 is associated with the item 130 due to the particular other restriction 154. Thereafter, the catalog management application 118 returns to box 342 and determines whether another type of restriction 145 remains to be processed for the item 130.

Figure 6:
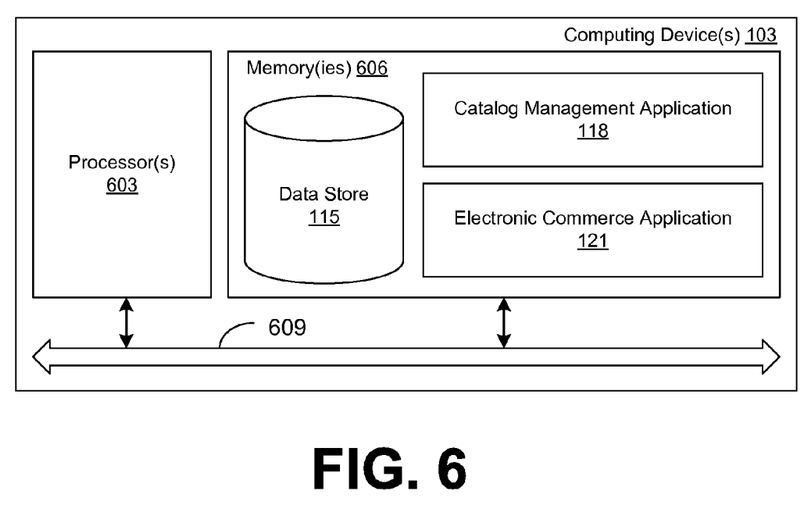
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the catalog management application 118, the electronic commerce application 121, and potentially other applications. Also stored in the memory 606 may be a data store 115 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 112 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the catalog management application 118, the electronic commerce application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the catalog management application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the catalog management application 118 and the electronic commerce application 121, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that applies a plurality of import rejection rules to each product in a product catalog, each of the import rejection rules including at least one condition and specifying a geographic area to which products matching the at least one condition cannot be imported, wherein the respective product is designated as restricted from shipment to the geographic area when the at least one condition is met;
   code that applies a plurality of import review rules to each of at least some of the products in the product catalog, each of the import review rules including at least one condition and specifying a geographic area, wherein the respective product is submitted for manual review when the at least one condition is met; and
   wherein each condition includes a product attribute name, at least one product attribute value, and an operator, and a given product meets a given condition when the at least one product attribute value of the given condition is applied to an attribute of the given product indicated by the product attribute name of the given condition using the operator of the given condition and a predetermined Boolean result is obtained.

2. The non-transitory computer-readable medium of claim 1, wherein the operator is selected from the group consisting of: equals, contains, greater than, and less than.

3. A system, comprising:
   at least one computing device; and a catalog management application executable in the at least one computing device, the catalog management application comprising:
   logic that applies a plurality of rejection rules to each item in a catalog of items, each of the rejection rules being associated with at least one condition and a geographic area;
   logic that designates the respective item as restricted for the geographic area when the at least one condition is met;
   logic that applies a plurality of restriction review rules to each item from the catalog of items that is undesignated as restricted for a geographic area, each of the restriction review rules being associated with at least one restriction review condition; and
   logic that submits the respective item for a manual restriction review when the at least one restriction review condition is met.

4. The system of claim 3, wherein the at least one condition comprises an item attribute name, at least one item attribute value, an operator, and a negation indicator.

5. The system of claim 3, wherein at least one of the rejection rules specifies an export restriction from the corresponding geographic area.

6. The system of claim 3, wherein at least one of the rejection rules specifies an import restriction to the corresponding geographic area.

7. The system of claim 3, wherein the rejection rules are associated with a plurality of geographic areas.

8. The system of claim 7, wherein at least one of the geographic areas comprises a country.

9. The system of claim 7, wherein at least one of the geographic areas comprises a subdivision of a country.

10. The system of claim 3, further comprising an electronic commerce application executable in the at least one computing device, the electronic commerce application comprising:
   logic that restricts shipment of at least one item from the catalog of items to at least one geographic area when the at least one item is designated as restricted for the at least one geographic area.

11. The system of claim 3, further comprising an electronic commerce application executable in the at least one computing device, the electronic commerce application comprising:
   logic that offers some of the items from the catalog of items for sale through a network site targeting a geographic area, wherein at least one item from the catalog of items is excluded from the network site when the at least one item is designated as restricted for the targeted geographic area.

12. The system of claim 3, wherein the catalog management application further comprises:
   logic that applies a plurality of shipping restriction rules to each item in the catalog of items, each of the shipping restriction rules being associated with at least one condition and a shipping carrier, wherein when the at least one condition is met, the logic that applies the shipping restriction rules is configured to designate the respective item as restricted by the shipping carrier.

13. A method, comprising the steps of:
applying, in at least one computing device, a plurality of rejection rules to an item in a catalog of items, each of the rejection rules being associated with at least one condition and a geographic area, the step of applying the rejection rules further comprising the step of:
   designating the item as restricted for the geographic area when the at least one condition is met; and
applying, in the at least one computing device, a plurality of restriction review rules to the item, the step of applying the restriction review rules further comprising the step of:
   submitting the item for a manual restriction review when a corresponding restriction review condition is met.

14. The method of claim 13, wherein the step of applying the restriction review rules further comprises the step of designating the item as restricted for the geographic area when the manual restriction review indicates a restriction for the item for the geographic area.

15. The method of claim 13, wherein the step of designating the item as restricted for the geographic area further comprises the step of configuring, in the at least one computing device, an electronic commerce application to restrict shipment of the item to the geographic area.

16. The method of claim 13, wherein the step of designating the item as restricted for the geographic area further comprises the step of configuring, in the at least one computing device, an electronic commerce application to preclude shipment of the item to the geographic area.

17. The method of claim 13, wherein the step of designating the item as restricted for the geographic area further comprises the step of configuring, in the at least one computing device, an electronic commerce application to preclude shipment of the item from a fulfillment center in the geographic area.

18. The method of claim 13, further comprising the step of applying, in at least one computing device, a plurality of shipping restriction rules to the item, each of the rejection rules being associated with at least one condition and a shipping carrier, the step of applying the shipping restriction rules further comprising the step of:
   designating the item as restricted by the shipping carrier when the at least one condition is met.

19. The method of claim 13, wherein the step of applying the rejection rules is applied to all items in the catalog of items, and the step of applying the restriction review rules is applied to at least some of the items in the catalog of items.

20. The method of claim 13, wherein the item corresponds to a new item that has been added to the catalog of items within a time frame.

* * * * *